United States Patent Office 3,296,254
Patented Jan. 3, 1967

---

3,296,254
1α,11α-EPOXY STEROIDS AND PROCESS
George B. Spero, Kalamazoo, Mich., assignor to The Upjohn Company, Kalamazoo, Mich., a corporation of Delaware
No Drawing. Filed Jan. 31, 1962, Ser. No. 170,275
20 Claims. (Cl. 260—239.55)

This invention relates to novel 1α,11α-epoxy steroids and to processes for the production thereof.

Some of the novel compounds of this invention are represented by the following formulae:

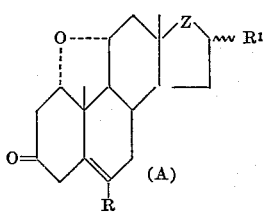

and

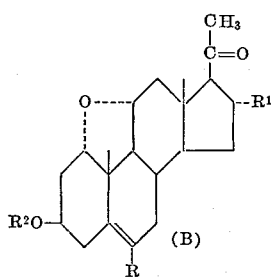

wherein R and $R^1$ are selected from the group consisting of hydrogen and methyl in which when R is methyl $R^1$ is hydrogen, $R^2$ is selected from the group consisting of hydrogen or the acyl radical of an organic carboxylic acid, preferably a hydrocarbon carboxylic acid containing from 1 to 12 carbon atoms, inclusive, and Z is selected from the group consisting of:

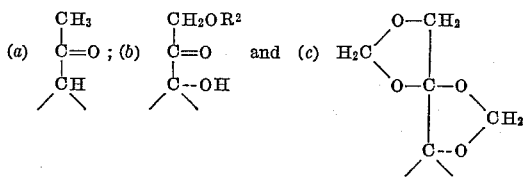

in which $R^2$ is defined as above.

In this application, the wavy line appearing at the 16-position indicates the α (alpha) configuration, the β (beta) configuration or mixtures thereof.

The novel 1α,11α-epoxy compounds of this invention are useful intermediates in the preparation of therapeutically important 1-dehydrocorticoids, e.g., prednisone, prednisolone, dexamethasone, medrol (6-methylprednisolone) 16α-methylprednisolone and the like. The novel process of this invention constitutes a new approach to the production of 1-dehydrocorticoids. Heretofore the 1,2-double bond has been introduced either by bromination and dehydrobromination or by dehydrogenation with selenium dioxide or microbiological methods.

The process of this invention comprises treating an 11-hydroxy compound of the androstane or the pregnane series, containing no other free hydroxyl groups, with a metal acylate having oxidizing action to produce the corresponding 1α,11α-epoxide. The epoxy group is then opened with an acid or a base to produce the corresponding $\Delta^1$-11α-hydroxy steroid.

Starting materials for the process of the present invention are 11-hydroxy compounds of the pregnane and androstane series which can also contain further substituents in the ring system and in the side chain, more especially in one or several of the 2, 3, 4, 5, 6, 7, 8, 9, 10, 12, 14, 15, 16, 17, 18, 19, 20, 21 and 22-positions such as for example esterified or etherified hydroxyl groups, free or ketalized oxo groups, esterified carbonyl groups, lower-alkyl groups e.g., methyl, ethyl, propyl and the like or halogen atoms and which can also contain one or more double bonds in the ring system and in the side chain, e.g., 5, 6, 15, 16, 17 (20) and the like.

Typical starting materials including 11α-hydroxyprogesterone bis alkylene ketal, 11α-hydroxy-6α-methylprogesterone bis alkylene ketal, 11α-hydroxy-16α-methylprogesterone bis alkylene ketal, 11α-hydroxy-16β-methylprogesterone bis alkylene ketal, lower-alkyl 11α-hydroxy-4,17(20)[cis] - pregnadien-3-one-21-oate alkylene ketal, lower alkyl 11α-hydroxy-6-methyl-4,17(20)[cis]-pregnadien-3-one-21-oate alkylene ketal, lower-alkyl 11α-hydroxy-16α-methyl-5,17(20)[cis] - pregnadien-3-one-21-oate alkylene ketal, lower-alkyl 11α-hydroxy-16β-methyl-5,17(20)[cis] - pregnadien-3-one-21-oate alkylene ketal, 11α-hydroxypregnenolone 3-acylate, 11α - hydroxy-16α-methyl pregnenolone 3-acylate, 11α-hydroxy-6-methyl-pregnenolone 3-acylate, 11α-hydroxy-4-androstane-3,17-dione bis alkylene ketal, 11α-hydroxy-5α-pregnane-3,20-dione bis alkylene ketal, the corresponding 11β-hydroxy compounds of those listed above, 17:20, 20:21-bismethylenedioxy-11β-hydroxy - 4 - pregnen-3-one alkylene ketal, 17:20,20:21-bismethylenedioxy - 11β-hydroxy-6α-methyl-4-pregnen-3-one alkylene ketal, 17:20,20:21-bismethylene-dioxy-11β-hydroxy - 16α - methyl-4-pregnen-3-one 3-alkylene ketal, 17:20,20:21 - bismethylenedioxy-11β-hydroxy-16β-methyl-4-pregnen-3-one alkylene ketal and the like. Many of the above listed compounds are known in the art, the others are prepared in accordance with preparations 1 through 10 contained herein.

The process for the preparation of the 1α,11α-epoxy compounds of this invention is illustratively represented by the following reaction schemes:

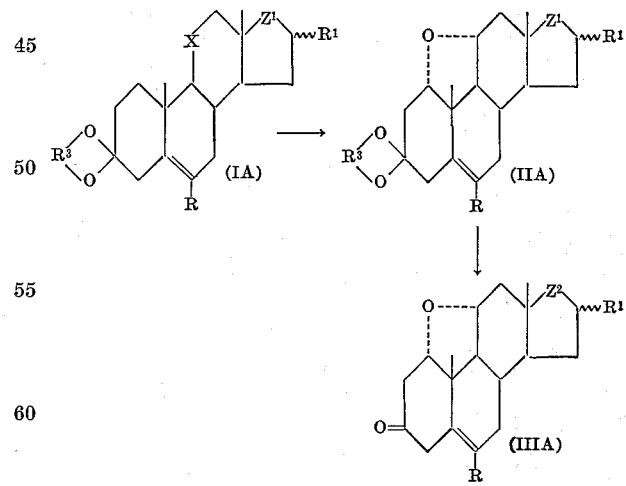

wherein R and $R^1$ have the meanings previously given, $R^3$ is an alkylene radical containing not more than 8 carbon atoms, inclusive, and the attaching oxygen to carbon bonds are separated by a chain of at least 2 and not more than 3 carbon atoms, e.g., ethylene, 1,2-propylene, 1,3-propylene, 2,3-butylene, 2,4-amylene, 4-methyl-1,2-amylene, 6-methyl-1,4-hexylene, 1,2-heptylene, 3,4-heptylene, 1,3-octylene, etc., X is selected from the group consisting of the α-hydroxymethylene radical

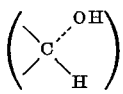

and the β-hydroxymethylene radical

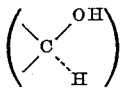

$Z^1$ is selected from the group consisting of:

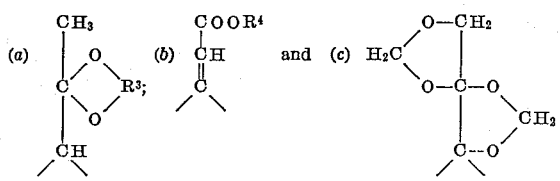

in which $R^3$ is defined as above and $R^4$ is a lower alkyl radical, containing from 1 to 8 carbon atoms, inclusive, and $Z^2$ is selected from the group consisting of

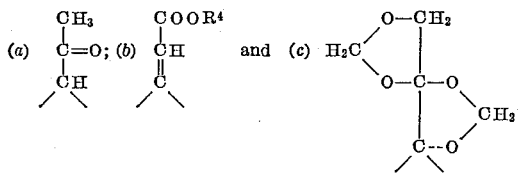

in which $R^4$ is defined as above.

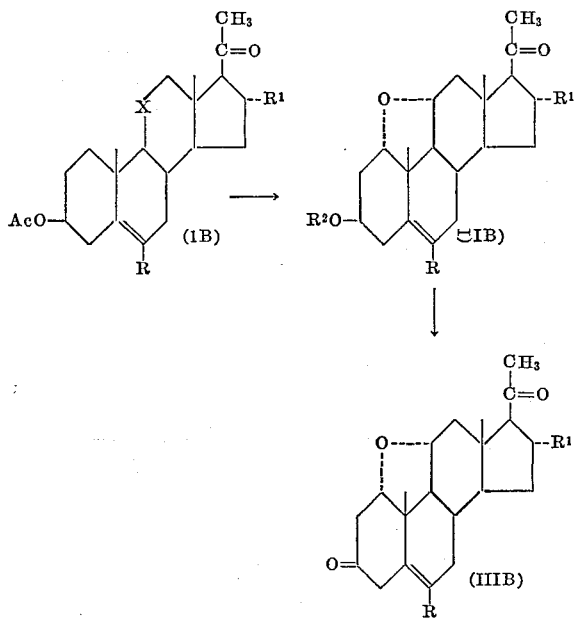

wherein Ac is the acyl radical of an organic carboxylic acid preferably a hydrocarbon carboxylic acid containing from 1 to 12 carbon atoms, inclusive, R, $R^1$, $R^2$ and X have the same meanings as meaning previously given.

The 1α,11α-epoxidation process comprises: treating an 11-hydroxy steroid of the androstane or pregnane series containing no other free hydroxy groups, e.g., the compounds of Formulas IA and IB with a lead tetraacylate in which the acyl radical is that of a lower aliphatic or aromatic acid, for example, lead tetraacetate, lead tetrapropionate, lead tetrabutyrate, lead tetrabenzoate and the like to produce the corresponding 1α,11α-epoxy compounds of Formulas IIA and IIB. The reaction is carried out in a non-polar solvent which is inert to the oxidizing agent, e.g., cyclohexane, methylcyclohexane, dimethylcyclohexanes, benzene, toluene and the like. The reaction is conveniently carried out at the reflux temperature of the reaction mixture although higher or lower temperatures can be used, e.g., a temperature between 50 degrees centigrade and the boiling point of the reaction mixture. The reaction is continued until the reaction is essentially complete. The reaction time depends on the solvent employed and the temperature at which the reaction is carried out. The 1α,11α-epoxide is recovered from the reaction mixture by conventional methods, e.g., chromatography and/or crystallization from a suitable solvent. The 3-ketal and 3,20-bisketal compounds of Formula IIA can be hydrolyzed by known methods for hydrolyzing cyclic ketal groups, e.g., dilute sulfuric acid as disclosed in U.S. Patents 2,707,184, 2,758,993, and 2,968,655 to give the corresponding 3 and 3,20-diketo compounds of Formula IIIA.

The 3-acylates of Formula IIB can be hydrolyzed to the corresponding 3-hydroxy compounds (IIB) in accordance with known methods for hydrolyzing 3-acylate groups to free alcohols, e.g., pregnenolone acetate to pregnenolone. The free hydroxy compounds of Formula IIB can then be oxidized at the 3-position by known methods, e.g., with an N-haloamide or an N-haloimide in pyridine, with chromic anhydride or chromium trioxide and dilute sulfuric acid in an organic solvent, e.g., acetone, or methylene chloride, with sodium dichromate and glacial acetic acid, or other known oxidizing agents to produce the corresponding 3-keto compounds of Formula IIIB.

Compounds of the androstane series can also be converted to the corresponding 1α,11α-epoxides, e.g., 11α-hydroxy-4-androstene-3,20-dione bis alkylene ketal or the corresponding 11β-hydroxy compound can be converted to 1α,11α-epoxy-4-androstene-3,20-dione bis alkylene ketal with a lead tetraacylate in accordance with the process described, above, followed by deketalization by known methods, e.g., hydrolysis with sulfuric acid to produce 1α,11α-epoxy-5-androstane-3,20-dione, an active anabolic androgenic agent having cholesterol lowering activity.

The novel 4,17(20)-pregnadienes of Formula IIA(a) can be converted to the corresponding compounds having the full cortical side chain in accordance with procedures well-known in the art. The process is represented by the following reaction scheme:

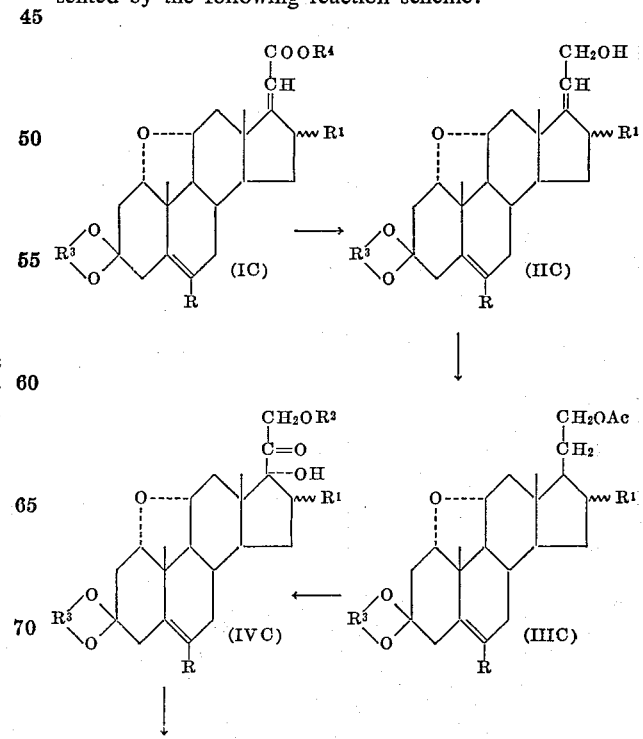

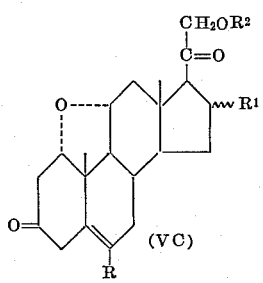

(VC)

wherein Ac, R, R,¹ R², R³ and R⁴ have the same meanings as previously given.

The conversion of the compounds of Formula IC to the compounds of Formula VC can be accomplished in accordance with methods known in the art for converting 21-esters to the adrenal cortical hormone side chain. The 21-carboxylic acid ester group of Formula IC is first reduced with lithium aluminum hydride (U.S. Patent 2,707,-184) to produce the corresponding 21-hydroxy compound (IIC), which is then esterified with an acylating agent in accordance with methods known in the art, e.g., the preparation of hydrocortisone acylate from hydrocortisone, for example with the acid chlorides, bromides, and anhydrides of an organic carboxylic acid, preferably a hydrocarbon carboxylic acid containing from 1 to 12 carbon atoms, inclusive, to produce the corresponding 21-acylate (IIIC). The thus-produced ester is then oxidatively hydroxylated with osmium tetroxide and an oxidizing agent, e.g., hydrogen peroxide, an organic peracid, an amine oxide peroxide, or an aryl iodo oxide, in the manner described in U.S. Patent 2,769,823, 2,769,825, or Hogg et al., J. Am. Chem. Soc., 77, 4436 (1955); to produce the corresponding 17α-hydroxy-20-keto-21-acyloxy compound IVC, which can be hydrolyzed with base, e.g., sodium methoxide, sodium hydroxide, sodium bicarbonate in methanol, preferably while purging with nitrogen to produce the corresponding 21-hydroxy compound (IVC). The 3-ketal group can be removed either before or after hydrolysis of the 21-acylate in accordance with the method heretofore described for hydrolyzing cyclic ketal groups, e.g., using dilute sulfuric acid, to produce the corresponding 3-keto compounds of Formula VC.

The 1α,11α-epoxy-3-keto compounds of Formula A and IIIB, above, are easily converted with an acid or a base to the corresponding Δ¹,⁴-11α-hydroxy compounds of the following formula:

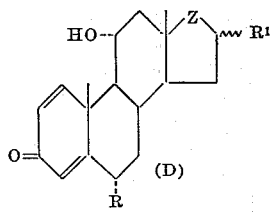

(D)

wherein R, R¹ and Z have the same meanings as previously given. The oxide opening is carried out by heating the selected 1α,11α-epoxy compound of Formula A in an organic acid such as glacial acetic acid, propionic acid, butyric acid and the like or with a mineral acid, e.g., hydrochloric acid, sulfuric acid, phosphoric acid, etc., in the presence of a suitable organic solvent such as ethanol, methanol, propanol, acetone and the like, or the epoxide opening can be preferably carried out under basic conditions for example by dissolving or suspending the selected 1α,11α-epoxide in a suitable organic solvent, e.g., ethanol, methanol, propanol, butanol, acetone, dioxane, etc., and treating the reaction mixture with a base, for example with an alkali metal salt of an aliphatic carboxylic acid, such as sodium acetate, potassium acetate, sodium propionate and the like; alkali metal alcoholates, bicarbonates, carbonates, and hydroxides, e.g., sodium methylate, sodium bicarbonate, potassium carbonate, sodium hydroxide and the like to produce the corresponding Δ¹,⁴-11α-hydroxy compound (D). Sodium acetate in ethanol is preferred for conversion of the 1α,11α-epoxides to the corresponding Δ¹,⁴ compounds.

The compounds of Formula D having the progesterone side chain, i.e., Z=(a)

are converted to the corresponding 4,17(20)[cis]-pregnadien-21-oic acid lower-alkyl ester in the manner described in U.S. Patent 2,790,814 for the conversion of 11-ketoprogesterone to 3,11-diketo-4,17(20)-pregnadien-21-oic acid methyl ester, i.e., the selected 11α-hydroxyprogesterone is reacted with more than two molar equivalents each of an alkyl diester of oxalic acid, preferably methyl or ethyl oxalate, and a base, preferably sodium methoxide or ethoxide or potassium tertiary butoxide, to produce the alkali-metal dienolate of the corresponding 2,21-dialkoxyoxalyl-11α-hydroxyprogesterone. This compound, or the free enol prepared by reaction of the alkali-metal dienolate with acetic acid, is then trihalogenated with chlorine or bromine, preferably the latter, to produce the corresponding 2,21-dialkoxyoxalyl-2,21,21-trihalo-11α-hydroxyprogesterone. This compound rearranges with strong base, e.g., an alkali-metal alkoxide, in the presence of an alkanol, e.g., sodium methoxide in methanol or sodium ethoxide in ethanol, to produce the corresponding 2-halo-11α-hydroxy-3-keto-4,17(20)-pregnadien-21-oic acid alkyl ester. The 2-halo group is removed by zinc and acetic acid or other halogen removing agent to produce the corresponding 11α-hydroxy-3-keto-4,17(20)[cis]-pregnadien-21-oic acid alkyl ester which is then ketalized at the 3-position by reaction with an alkylene glycol, e.g., ethylene glycol in the presence of p-toluenesulfonic acid, to produce the corresponding 3-alkylene ketal which can be converted to the corresponding compounds represented by Formula D in which Z=(b)

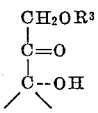

in the same manner as described hereinabove for converting the compounds of Formula IC to the compounds of Formula VC.

The compounds of Formula D in which Z=(b) and (c) are then converted to known and highly active 1-dehydrocorticoids in accordance with methods known in the art, e.g., the conversion of epi-hydrocortisone to cortisone, as shown by the following reaction scheme:

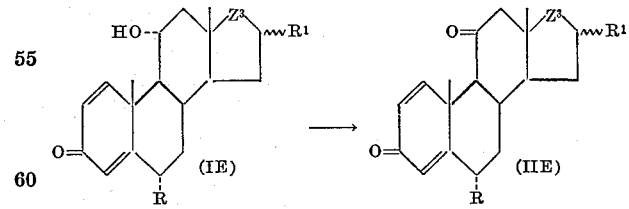

wherein Z³ selected from the group consisting of (a)

and (b)
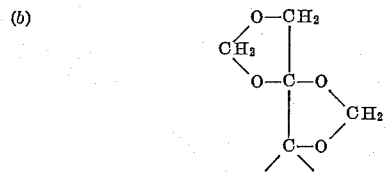

and R, R¹ and R² have the same meanings as previously given. For example, the selected compound of Formula IE is oxidized at the 11-position with an oxidizing agent, e.g., sodium dichromate to give the corresponding 11-keto compound IIE.

The following preparation and examples are illustrative of the products and process of this invention.

PREPARATION 1

11α-hydroxy-16β-methylprogesterone

To 16.6 l. of a fermentation medium consisting of 1.2% corn steep solids and 2% Cerelose glucose and adjusted to a pH of 4.8 to 5.0 was added an inoculum of *Rhizopus nigricans* (A.T.C.C. 6227b) and the medium incubated for 24 hours at a temperature of 28° C. with a rate of aeration of 5% air by volume per minute. To this medium was added 5 g. of 16β-methylprogesterone dissolved in 35 ml. of acetone. After an additional 24 hours, of incubation under the same conditions, the mycelium was filtered, washed twice, each time with a volume of acetone approximately equal to the volume of the mycelium and then twice with similar portions of methylene chloride. The combined extracts were added to the beer filtrate and the whole was extracted successively with 2 one-half by volume portions of methylene chloride and then with 2 one-fourth by volume portions of methylene chloride. These extracts were washed with 2 one-tenth by volume portions of 2% aqueous sodium bicarbonate and then with 2 one-tenth by volume portions of water. The methylene chloride extracts were then dried and the solvent removed by distillation. The residue was dissolved in 250 ml. of methylene chloride and chromatographed over a 500 g. column of magnesium silicate (Florisil). The column was developed with 5 l. of methylene chloride, 5 l. of hexanes (Skellysolve B) plus 5% acetone, 10 l. of hexanes plus 10% acetone, 5 l. of hexanes plus 25% acetone and 2 l. of acetone. The last 7 l. of hexanes plus 10% acetone, the hexanes plus 25% acetone and the first acetone eluates were combined, freed of solvent, redissolved in methylene chloride and rechromatographed over 400 g. of magnesium silicate. The column was developed with 8 l. of hexanes plus 10% aceton, 8 l. of hexanes plus 15% acetone, 4.1 of hexanes plus 20% acetone, 4.1 of hexanes plus 25% acetone and 2,400 ml. of acetone, in that order. The residues from the hexanes plus 10% acetone recrystallized from ethyl acetate to give 11α-hydroxy-16β-methylprogesterone, a light colored crystalline solid.

PREPARATION 2

Methyl-11α-hydroxy-16α-methyl-4,17(20)-[cis]-pregnadien-3-one 21-oate

A solution of 2.00 g. of 11α-hydroxy-16α-methyl-progesterone in dry tertiary butyl alcohol was warmed to about fifty degrees and stirred under nitrogen. To the solution was added 3.2 ml. of ethyl oxalate and 3.03 of a 25% methanolic sodium methoxide solution. A precipitate of the sodium dienolate of 2,21-diethoxyoxalyl-11α-hydroxy-16α-methylprogesterone appeared almost immediately.

The mixture was stirred for twenty minutes after which a cooled solution of 0.98 g. of anhydrous sodium acetate and 0.84 ml. of acetic acid in 40 ml. of methanol was added, thus producing the free dienol. The solution was cooled to zero degrees centigrade and then treated dropwise with a cold solution of 2.0 grams of bromine in methanol over a period of ten minutes. There was thus produced 2,21,21-tribromo-2,21-diethoxyoxalyl-11α-hydroxy-16α-methylprogesterone.

The cooling bath was removed and to the solution was added 5.72 g. of a 25% methanolic sodium methoxide solution. The stirring was continued for 2.5 hours. There was thus produced methyl 2-bromo-11α-hydroxy-16α-methyl-4,17(20)-[cis]-pregnadien-3-one 21-oate.

To the resulting solution was then added 5 ml. of acetic acid and 1.0 g. of zinc dust and stirring was continued for 30 minutes. The mixture was diluted with water and solids were filtered and the filtrate extracted thoroughly with methylene chloride. The extract was dried with sodium sulfate and evaporated. The residue was dissolved in methylene chloride and chromatographed over a 200 g. column of magnesium silicate (Florisil). The column was developed with hexanes (Skellysolve B) containing increasing proportions of acetone to give methyl 11α-hydroxy-16α-methyl-4,17(20)-[cis]-pregnadien-3-one 21-oate, a light colored crystalline solid which can be further purified by recrystallization from a suitable organic solvent, e.g., methanol.

In the same manner substituting as starting material 11α-hydroxy-16β-methylprogesterone, or 11α-hydroxy-6α-methylprogesterone in place of 11α-hydroxy-16α-methylprogesterone, Preparation 1 is productive of methyl 11α - hydroxy - 16β-methyl-4,17(20)[cis]-pregnadien-3-one 21-oate and methyl 11α-hydroxy-6α-methyl-4,17(20)[cis]-pregnadien-3-one 21-oate, respectively.

In the same manner, other esters are prepared wherein the ester is ethyl, propyl, butyl, etc., by replacing the sodium methoxide in methanol by the selected alkali-metal alkoxide in an alkanol.

PREPARATION 3

17:20,20:21-bismethylenedioxy-11β-hydroxy-16β-methyl-4-pregnen-3-one

To a stirred solution of 7.5 g. of 16β-methylhydrocortisone in methylene chloride at about 25° C. is added a solution premixed at 0° C. of 110 ml. of low-methanol content formaldehyde (37% aqueous solution) and 110 ml. of concentrated hydrochloric acid. The reaction mixture is stirred at about 25° C. for approximately 20 hours, followed by the addition of about 1 liter of water. The layers are separated and the aqueous layer is extracted with methylene chloride. The combined methylene chloride layer and extracts are washed with 200 ml. of water, saturated potassium bicarbonate, and two 200 ml. portions of water. The methylene chloride solution is then dried over anhydrous sodium sulfate and evaporated to dryness under reduced pressure. The residue thus obtained is triturated with ether to yield 17:20,20:21-bismethylenedioxy - 11β-hydroxy-16β-methyl-4-pregnen-3-one, a light colored crystalline solid.

In the same manner, substituting as the starting material, 6α-methylhydrocortisone, Preparation 4 is productive of 17:20,20:21-bismethylenedioxy-11β-hydroxy-6α-methyl-4-pregnen-3-one.

PREPARATION 4

11α-hydroxy-16β-methylprogesterone 3,20-bis(ethylene ketal)

A solution of 10 g. of 11α-hydroxy-16β-methylprogesterone, 1 g. of para-toluenesulfonic acid in 1000 ml. of benzene and 150 ml. of ethylene glycol was refluxed for 6 hours using a water trap to remove the water formed in the reaction. The solution was cooled, water was added and the aqueous layer was separated and extracted with ether and the ether extracts added to the organic layer. The combined organic layers were successively washed with 5% sodium bicarbonate solution, saturated sodium chloride solution, water and then dried over sodium sulfate. The solvents were removed by distillation and the thus-obtained residue was recrystallized from methanol to give 11α-hydroxy-16β-methylprogesterone 3,20-bis-(ethylene ketal).

In the same manner, substituting as starting material in Preparation 3,

17:20,20:21-bismethylenedioxy-11β-hydroxy-4-pregnen-3-one,

17:20,20:21-bismethylenedioxy-11β-hydroxy-6α-methyl-4-pregnen-3-one,
17:20,20:21-bismethylenedioxy-11β-hydroxy-16α-methyl-4-pregnen-3-one,
17:20,20:21-bismethylenedioxy-11β-hydroxy-16β-methyl-4-pregnen-3-one,
11α-hydroxy-4-androstane 3,17-dione,
methyl 11α-hydroxy-6α-methyl-4,17(20)[cis]-pregnadien-3-one-21-oate,
methyl 11α-hydroxy-16α-methyl-4,17(20)[cis]-pregnadien-3-one-21-oate or
methyl 11α-hydroxy-16β-methyl-4,17(20)[cis]-pregnadien-3-one-21-oate is productive of 17:20,20:21-bismethylenedioxy-11β-hydroxy-4-pregnen-3-one ethylene ketal,
17:20,20.21-bismethylenedioxy-11β-hydroxy-6α-methyl-4-pregnen-3-one ethylene ketal,
17:20,20:21-bismethylenedioxy-11β-hydroxy-16α-methyl-4-pregnen-3-one ethylene ketal,
17:20,20:21-bismethylenedioxy-11β-hydroxy-16β-methyl-4-pregnen-3-one ethylene ketal,
11α-hydroxy-4-androstane-3,17-dione bis ethylene ketal,
methyl 11α-hydroxy-6α-methyl-4,17(20)[cis]-pregnadien-3-one-21-oate ethylene ketal,
methyl 11α-hydroxy-16α-methyl-4,17(20)[cis]-pregnadien-3-one-21-oate ethylene ketal and
methyl 11α-hydroxy-16β-methyl-4,17(20)[cis]-pregnadien-3-one-21-oate ethylene ketal, respectively.

In the same manner other 3-ketals and 3,20-bis ketals of the above compounds are produced by the reaction of the selected free keto compound with a glycol as hereinbefore described, e.g., propylene glycol, trimethylene glycol, lower-alkyl substituted ethylene glycols or trimethylene glycols and the like, in the presence of an acid catalyst, e.g., paratoluenesulfonic acid, hydrogen chloride, sulfuric acid.

In the same manner, other esters of the 4,17(20)-pregnadienes can likewise be ketalized at the 3-position.

PREPARATION 5

6β-hydroxy-3,5-cyclopregnan-20-one (I)

Pregnenolone (3β-hydroxy-5-pregnen-20-one) (7.8 g.) dissolved in pyridine (100 ml.) was left at room temperature overnight with p-toluene-sulphonyl chloride (7.8 g.). Water was added and the precipitate collected, washed with water and dried. Crystallization from acetone gave pregnenolone p-toluenesulphonate ester, M.P. 147° C.

Pregnenolone p-toluenesulphonate ester (5 g.) was heated with potassium acetate (5.5 g.) in acetone (70 ml.) and water (70 ml.) under reflux for 8 to 18 hours. The reaction mixture was then poured into water and the product extracted with ether containing a little chloroform. The extract was dried and the solvent distilled. The crude product was recrystallized from acetone, yielding 6-hydroxy-3:5-cyclopregnan-20-one, needles, P.M. 181° C., $[\alpha]_D^{24}+123°$ (c., 0.663 in chloroform).

In the same manner following the above procedure, but substituting as starting material in place of pregnenolone, 16α-methylpregnenolone or 6-methylpregnenolone, Preparation 5 is productive of 6β-hydroxy-16α-methyl-3,5-cyclopregnan-20-one and 6β-hydroxy-6α-methyl-3,5-cyclopregnan-20-one, respectively.

PREPARATION 6

6β,11α-dihydroxy-3,5-cyclopregnan-20-one (II)

A medium was prepared of 2.5 kg. of cornsteep liquor (60% solids) and 1.25 kg. of commercial dextrose, diluted to 125 l. and adjusted to a pH of about 5.5; 25.0 ml. of lard oil was added as an antifoam preventive. This sterilized medium was inoculated with a 72-hour vegetative growth of Rhizopus nigricans (ATCC 6227b) and incubated for 72 hours at a temperature of about 28° C. using a rate of aeration of 5 l. per minute at 300 r.p.m. After 72 hours of agitation, at which time the pH of the beer was 7.2, a solution of 20 g. of 6β-hydroxy-3,5-cyclopregnan-20-one (I) in 300 ml. of N,N-dimethylformamide was added to the inoculated medium. After an additional 24-hour period of incubation, the beer and mycelium were separated by filtration. The mycelium was washed with water and the washwater was added to the beer filtrate. The thus-obtained beer filtrate was extracted 4 times with a volume of methylene chloride:ethyl acetate (2:1 by volume) equal to one-fourth the volume of the filtrate. The combined extracts were washed with one-fourth volume of distilled water and the solvent was removed by distillation to give a crude residue. This residue was taken up in about 700 ml. of acetone and the solution treated with 7.0 g. of activated charcoal and filtered. The solution was then distilled to a volume of about 150 ml. whereupon the product crystallized giving 14.26 g. of 6β,11α-dihydroxy-3,5-cyclopregnan-20-one, M.P. 211.5–217°. Three recrystallizations from acetone afforded an analytical sample of 6β,11α-dihydroxy-3,5-cyclopregnan-20-one, M.P. 211.5–217°, moving as a single spot on a Bush system paper chromatogram. The infrared spectrum was consistent with the indicated structure: $\lambda_{max}$. 3500, 3430, 1695, 1065, 1050 and 1025 cm.$^{-1}$.

Analysis.—Calcd. for $C_{21}H_{32}O_3$: C, 75.86; H, 9.70. Found: C, 76.02; H, 10.00.

In the same manner substituting as starting material 6β-hydroxy-16α-methyl-3,5-cyclopregnan-20-one or 6β-hydroxy-6α-methyl-3,5-cyclopregnan-20-one is productive of 6β,11α-dihydroxy-16-methyl-3,5-cyclopregnan-20-one and 6β,11α-dihydroxy-6α-methyl-3,5-cyclopregnan-20-one, respectively.

PREPARATION 7

6β,11β-dihydroxy-3,5-cyclopregnan-20-one

Following the procedure of Preparation 6 but substituting Cunninghamella blakesleena (ATCC 8688A) for Rhizopus nigricans 6β-hydroxy-3,5-cyclopregnan-20-one is converted to 6β,11β-dihydroxy-3,5-cyclopregnan-20-one, M.P. 239–243° C., $\lambda_{max}$. 3500, 3400 and 1695 cm.$^{-1}$.

Analysis.—Calcd. for $C_{21}H_{32}O$: C, 75.86; H, 9.70. Found: C, 75.68; H, 9.71.

In the same manner, substituting as starting material 6β-hydroxy-16α-methyl-3,5-cyclopregnan-20-one or 6β-hydroxy-6α-methyl-3,5-cyclopregnan-20-one is productive of 6β,11β-dihydroxy-16α-methyl-3,5-cyclopregnan-20-one and 6β,11β-dihydroxy-6α-methyl-3,5-cyclopregnan-20-one, respectively.

PREPARATION 8

11α-hydroxypregnenolone

One gram of 6β,11α-dihydroxy-3,5-cyclopregnan-20-one (II) was dissolved in 100 ml. of acetone with warming and treated with 1 ml. of 3 N hydrochloric acid at reflux for ½ hour during which the volume of solution was reduced by distillation at about 75 ml. The solution was diluted with water to about 100 ml. giving an amorphous solid which after drying weighed 1.0 g. This material was recrystallized from acetone-Skellysolve B hexanes to give 250 mg. of colorless needles, M.P. 170–173°. Recrystallization of this material for analysis from ethyl acetate-Skellysolve B hexanes gave colorless rosettes of 11α-hydroxypregnenolone, M.P. 179.0–181.0, $\lambda_{max}$. 3420, 3340, 5020, 3000, 1618, 1063 and 1020 cm.$^{-1}$, moving as a single spot on a Bush B–1 system paper-chromatogram.

Analysis.—Calcd. for $C_{21}H_{32}O_3$: C, 75.86; H, 9.70. Found: C, 75.83; H, 9.38.

In the same manner, substituting as starting material 6β,11β-dihydroxy-3,5-cyclopregnan-20-one, 6β,11α-dihydroxy-16α-methyl-3,5-cyclopregnan-20-one, 6β,11β-dihydroxy-16α-methyl-3,5-cyclopregnan-20-one, 6β,11α-dihydroxy-6α-methyl-3,5-cyclopregnan-20-one or 6β,11β- dihydroxy-6α-methyl-3,5-cyclopregnan-20 - one, Preparation 8 is productive of 11β-hydroxypregnenolone, 11α-hydroxy - 16α - methylpregnenolone, 11β-hydroxy-16α-methylpregnenolone, 11α-hydroxy-6-methylpregnenolone and 11β-hydroxy-6-methylpregnenolone, 3-respectively.

PREPARATION 9

11β-hydroxypregnenolone 3-acetate

A mixture was prepared containing 1.0 g. of 11β-hydroxypregnenolone, 20 ml. of acetic acid, 5 ml. of acetic anhydride and 0.4 g. of p-toluenesulfonic acid monohydrate. The mixture was allowed to stand overnight at room temperature. An excess of water was then poured into the reaction mixture and the mixture was chilled at 5° C. The precipitate thus obtained was collected on a filter, washed with cold water and dried to give 11β-hydroxypregnenolone 3-acetate, a light-colored crystalline solid.

In the same manner, substituting 11β-hydroxy-16α-methylpregnenolone or 11β-hydroxy-6α-methylpregnenolone as starting material is productive of 11β-hydroxy-16α - methylpregnenolon 3-acetate and 11β-hydroxy-6α-methyl pregnenolone 3-acetate, respectively.

Other 3-acylates of these 11β-hydroxy compounds can be prepared in accordance with the procedure of Example 20, below.

PREPARATION 10

11α-hydroxypregnenolone 3-acetate

A mixture of 1.0 g. of 11α-hydroxypregnenolone in 20 ml. of acetic acid was refluxed for one hour. Water (100 ml.) was then poured into the reaction mixture. The water solution was then extracted with methylene chloride. The methylene chloride extracts were washed with water, dried over sodium sulfate and chromatographed on snythetic magnesium silicate to give 11α-hydroxypregnenolone acetate, a light-colored crystalline solid.

In the same manner, substituting 11α - hydroxy-16α-methylpregnenolone or 11α - hydroxy-6-methylpregnenolone as starting material is productive of 11α-hydroxy-16α - methylpregnenolone 3-acetate, and 11α-hydroxy-6-methylpregnenolone 3-acetate, respectively.

EXAMPLE 1

1α,11α-epoxyprogesterone bis ethylene ketal

A suspension of 5.0 g. of 11β-hydroxyprogesterone bis ethylene ketal and 15.0 g. of ether washed lead tetraacetate in about 1500 ml. of cyclohexane was allowed to stir at reflux for 4.5 hours. The initially brownish mixture gradually became white as the lead tetraacetate was consumed and the resulting white lead diacetate precipitated. The reaction mixture was cooled, filtered, and the filtrate was washed with 300 ml. of 5% solution of sodium thiosulfate, and water. After drying and evaporating to dryness and residue was crystallized from 30 ml. of acetone to give 1.33 g. of 1α,11α-epoxyprogesterone bis ethylene ketal, M.P. 195–215°. An analytical sample, recrystallized from methanol and ethyl acetate, melted at 212–217°, $[\alpha]_D$ —31° (dioxane). Infrared spectrum was in agreement with the structure.

Analysis.—Calcd. for $C_{25}H_{36}O_5$: C, 72.08; H, 8.71. Found: C, 72.06; H, 8.83.

In the same manner, substituting as starting material, 11α-hydroxyprogesterone bis ethylene ketal, 11β-hydroxy-6-methylprogesterone bis ethylene ketal, 11α-hydroxy-16α-methylprogesterone bis ethylene ketal or 11α-hydroxy-16β-methylprogesterone bis ethylene ketal, Example 1 is productive of 1α,11α-epoxyprogesterone bis ethylene ketal, 1α,11α - epoxy-6-methylprogesterone bis ethylene ketal, 1α,11α-epoxy-16 -methylprogesterone bis ethylene ketal and 1α,11α-epoxy-16β-methylprogesterone bis ethylene ketal, respectively.

EXAMPLE 2

1α,11α-epoxy-5-pregnene-3,20-dione

A solution of 730 mg. of 1α,11α-epoxyprogesterone bis ethylene ketal and 5 ml. of 1 N sulfuric acid in about 100 ml. of acetone was gently boiled on the steam bath for about 10 minutes. The reaction mixture was then concentrated under a stream of nitrogen until crystallization took place. Water (100 ml.) was added and the product filtered, washed and dried to give 474 mg. of crystals, M.P. 185–195°. One recrystallization from acetone gave 377 mg. of 1α,11α-epoxy-5-pregnene-3,20-dione, M.P. 203–208°. The analytical sample melted at 205–208°. Infrared spectrum and nuclear magnetic resonance measurements were in agreement with the structure.

Analysis.—Calcd. for $C_{21}H_{28}O_3$: C, 76.79; H, 8.59. Found: C, 76.75; H, 8.89.

In the same manner, substituting as starting material 1α,11α-epoxy-6α-methylprogesterone bis ethylene ketal, 1α,11α-epoxy-16α-methylprogesterone bis ethylene ketal or 1α,11α - epoxy-16β - methylprogesterone bis ethylene ketal, Example 1 is productive of 1α,11α-epoxy-6-methyl-5-pregnene-3,20-dione, 1α,11α - epoxy-16α-methyl-5-pregnene-3,20-dione and 1α,11α-epoxy-16β-methyl - 5 - pregnene-3,20-dione, respectively.

EXAMPLE 3

1α,11α-epoxy-5-pregnene-3,20-dione

One gram of 11α-hydroxyprogesterone bis ethylene ketal was treated with lead tetraacetate in accordance with the procedure of Example 1, above, to give 1α,11α-epoxyprogesterone bis ethylene ketal. The crude product was treated with 2 ml. of 2 N sulfuric acid in the same manner as described in Example 2, above, to give 0.57 g. of crude 1α,11α-epoxy-5-pregnene - 3,20 - dione, M.P. 140–170° C. Two recrystallizations from acetone gave 1α,11α-epoxy-5-pregnene - 3,20 - dione, M.P. 190–205° C. An analytical sample melted at 205–208° C. The same product was obtained in Example 2 from the 11β-epimer.

EXAMPLE 4

1-dehydro-11α-hydroxyprogesterone

A mixture of 100 mg. of 1α,11α-epoxy-5-pregnene-3,20-dione and 10 ml. of glacial acetic acid was refluxed for about 15 hours. The mixture was then evaporated to dryness under reduced pressure and the residue thus obtained was crystallized from acetone to give 52 mg. of 1-dehydro-11α-hydroxyprogesterone, M.P. 220–226° C.

EXAMPLE 5

1-dehydro-11α-hydroxyprogesterone

A solution of 100 mg. of 1α,11α-epoxy-5-pregnene-3,20-dione in about 20 ml. of absolute alcohol was prepared by warming. One hundred mg. of potassium acetate was added and the mixture was allowed to stir and reflux for about 16 hours. Water (50 ml.) was added and the solution was concentrated on the steam bath under reduced pressure to about 10 ml. or until crystallization started. After cooling, the solid was isolated to give 71 mg. of product, M.P. 185–205°. After three recrystallizations from acetone-Skellysolve B hexanes and ethyl acetate-Skellysolve B hexanes, 45 mg. of 1-dehydro-11α-hydroxyprogesterone, M.P. 226–230° was obtained. This was identical to known samples of 1-dehydro-11α-hydroxyprogesterone by mixed melting point and infrared analysis.

In the same manner, substituting as starting material in either Example 4 or 5, 1α,11α-epoxy-6-methyl-5-pregnene-3,20-dione, 1α,11α-epoxy-16α-methyl-5-pregnene - 3, 20-dione or 1α,11α-epoxy-16β-methyl-5-pregnene-3,20-dione, Examples 4 and 5 are productive of 1-dehydro-11α-hydroxy-6α-methylprogesterone, 1-dehydro-11α-hydroxy- 16α-methylprogesterone and 1-dehydro-11α-hydroxy-16β-methylprogesterone, respectively.

EXAMPLE 6

1α,11α-epoxy-5-androstene-3,17-dione

A suspension of 5 g. of 11α-hydroxy-4-androstene-3,17-dione bis ethylene ketal and 15.0 g. of lead tetraacetate in 1500 ml. of cyclohexane is allowed to stir until the reaction is complete (about 6 hrs.). The reaction mixture is then cooled, filtered and the filtrate washed with about 300 ml. of aqueous 5% sodium thiosulfate solution and water, and dried over sodium sulfate. The solution is then evaporated to dryness and the residue thus obtained, is recrystallized from acetone to give 1α,11α-epoxy-4-androstene-3,17-dione bis ethylene ketal, a light colored crystalline solid, which is then dissolved in acetone and treated with 5 ml. of 1 N sulfuric acid and heated on a steam bath for a few minutes. The reaction mixture is then concentrated until crystallization occurs. Water, 100 ml., is then added and the product thus obtained is filtered, washed and dried to give 1α,11α-epoxy-5-androstene-3,17-dione, a light colored crystalline solid which can be further purified by recrystallization from acetone.

In the same manner, the 11β-epimer can be substituted as starting material in Example 4 to give 1α,11α-epoxy-5-androstene-3,17-dione.

EXAMPLE 7

Methyl 1α,11α-epoxy-5,17(20)[cis]-pregnadiene-3-one-21-oate-3-ethylene ketal To a warm solution of 2.64 g. of methyl 11α-hydroxy-5,17(20)[cis]-pregnadien-3-one-21-oate 3 - ethylene ketal in about 750 ml. of purified cyclohexane (heating was necessary in order to effect solution) was added 10 g. of ether-washed lead tetraacetate. The mixture was allowed to stir and reflux for about 6 hours and was then cooled and filtered through Celite. The filtrate was washed with 5% potassium iodide solution, 5% sodium thiosulfate solution, and water, and was dried. Chromatography over Florisil gave a product fraction (761 mg.) eluted with 2.5 and 5% acetone in Skellysolve B hexanes. Crystallization from ether gave 494 mg. of methyl 1α,11α-epoxy-5,17(20)[cis]-pregnadien-3-one-21-oate, M.P. 150–158°. The analytical sample melted at 157–60°; $\lambda_{max}$ 224 ($\epsilon$10,300).

*Analysis.*—Calcd. for $C_{24}H_{32}O_5$: C, 71.97; H, 8.05. Found: C, 72.09; H, 7.91.

In the same manner, substituting as starting material methyl 11α-hydroxy-6-methyl-5,17(20)[cis]-pregnadien-3-one-21-oate 3-ethylene ketal, methyl 11α-hydroxy-16α-methyl-5,17(20)[cis]-pregnadien-3-one-21-oate 3-ethylene ketal or methyl 11α-hydroxy-16β-methyl-5,17(20)-[cis]-pregnadien-3-one-21-oate 3-ethylene ketal, Example 7 is productive of methyl 1α,11α-epoxy-6-methyl-5,17-(20)[cis]-pregnadien-3-one-21-oate 3-ethylene ketal, methyl 1α,11α-epoxy-16α-methyl-5,17(20)[cis]-pregnadien-3-one-21-oate 3-ethylene ketal and methyl 1α,11α-epoxy-16β-methyl-5,17(20)[cis]-pregnadien-3-one-21-oate 3-ethylene ketal, respectively.

EXAMPLE 8

1α,11α-epoxy-21-acetoxy-5,17(20)[cis]-pregnadien-3-one 3-ethylene ketal

To a suspension of 1 g. of lithium aluminum hydride in 50 ml. of anhydrous ether was added a solution of 0.5 g. of methyl 1α,11α-epoxy-5,17(20)[cis]-pregnadien-3-one-21-oate 3-ethylene ketal in 100 ml. of anhydrous ether. The mixture was allowed to stir and reflux for about 1.5 hours and was then cooled, and the excess lithium aluminum hydride decomposed by the careful addition of ethyl acetate followed by water. The organic phase was separated, washed with water, dried and evaporated to dryness to give a residue containing 1α,11α-epoxy-21-hydroxy-5,17(20)[cis]-pregnadien-3-one 3 - ethylene ketal. The residue, thus obtained, was dissolved in about 5 ml. of acetic anhydride and 5 ml. of pyridine and allowed to stand for about 16 hours at room temperature (about 25° C.). The reaction mixture was then poured into ice-water and extracted with ethyl acetate. The extract was washed with 5% sodium bicarbonate solution and water, dried over sodium sulfate and evaporated to dryness. Attempted crystallization of the residue was unsuccessful even after chromatography over synthetic magnesium silicate. The fraction eluted from the column with 5% acetone in hexanes gave 429 mg. of 1α,11α-epoxy-21-acetoxy-5,17(20)[cis]-pregnadien - 3 - one 3-ethylene ketal. Infrared analysis was consistant with the assigned structure. The product was used in Example 9 without further purification.

In the same manner substituting as starting material, methyl 1α,11α-epoxy-6-methyl-5,17(20)[cis]-pregnadien-3-one-21-oate 3-ethylene ketal, methyl 1α,11α-epoxy-16α-methyl-5,17(20)[cis]-pregnadien-3-one-21 - oate 3-ethylene ketal, methyl 1α,11α-epoxy-16β-methyl-5,17(20)[cis]-pregnadien-3-one-21-oate 3-ethylene ketal or other 21-alkyl esters of the named starting materials. Example 8 is productive of 1α,11α-epoxy-6-methyl-21-acetoxy-5,17-(20)[cis]-pregnadien-3-one 3-ethylene ketal, 1α,11α-epoxy-16α-methyl-21 - acetoxy - 5,17(20)[cis] - pregnadien-3-one 3-ethylene ketal and 1α,11α-epoxy-16β-methyl-21-acetoxy-5,17(20)[cis]-pregnadien-3-one 3-ethylene ketal.

Similarly other 21-acylates are prepared by esterification of the 21-hydroxy group in accordance with the procedure of Example 11.

Other 3-alkylene ketals of the above-named starting materials can likewise be substituted in place of the 3-ethylene ketals.

EXAMPLE 9

1α,11α-epoxy-17α-hydroxy-21-acetoxy-5-pregnene-3,20-dione 3-ethylene ketal

To a solution of 0.43 g. of 1α,11α-epoxy-21-acetoxy-5,17(20)[cis]-pregnadien-3-one 3-ethylene ketal in about 25 ml. of t-butyl alcohol and 0.65 ml. of pyridine was added 1.35 ml. of N-methylmorpholine oxide peroxide (2.0 N) followed by 15 mg. of osmium tetroxide. After stirring for 2.5 hours at room temperature, 15 ml. of a 5% solution of sodium hydrosulfite was added followed 15 minutes later by 0.5 g. of magnesol. After an additional 15 minutes, the stirrer was stopped and the mixture was filtered through Celite. The filtrate was concentrated to near dryness under reduced pressure, diluted with water, and extracted with ethyl acetate. The extract was washed with water, dried over sodium sulfate, and evaporated to dryness. Chromatography of the residue over magnesium silicate (Florisil) gave 182 mg. in the product fraction, eluted with 10 and 15% acetone in Skellysolve B hexanes which on crystallization from acetone-Skellysolve B hexanes gave 112 mg. of 1α,11α-epoxy-17α-hydroxy-21-acetoxy-5-pregnene-3,20-dione 3-ethylene ketal, M.P. 195–205. Two recrystallizations from the same solvents did not raise the melting point.

*Analysis.*—Calcd. for $C_{25}H_{34}O_7$: C, 67.24; H, 7.67. Found: C, 67.26; H, 8.32.

In the same manner substituting as starting material 1α,11α - epoxy - 6-methyl-21-acetoxy-5,17(20)[cis]-pregnadien-3-one 3-ethylene ketal, 1α,11α-epoxy-16α-methyl-21 - acetoxy - 5,17(20)[cis]-pregnadien-3-one 3-ethylene ketal, or 1α,11α-epoxy-16β-methyl-21-acetoxy-5,17(20)[cis]-pregnadien-3-one 3-ethylene ketal, Example 9 is productive of 1α,11α-epoxy-6-methyl-17α-hydroxy-21-acetoxy - 5-pregnene-3,20-dione 3-ethylene ketal, 1α,11α-epoxy - 16α-methyl-17α-hydroxy-21-acetoxy-5-pregnene-3,20-dione 3-ethylene ketal and 1α,11α-epoxy-16β-methyl - 17α - hydroxy-21-acetoxy-5-pregnene-3,20-dione 3-ethylene ketal, respectively.

In the same manner, other 21-esters of the above compounds are prepared by substituting as starting material other 21-acylates of the above compounds to produce the corresponding 21-acylate, e.g., 1α,11α-epoxy-17α-hydroxy - 21 - propionoxy-5-pregnene-3,20-dione 3-ethylene ketal, 1α,11α-epoxy-6-methyl-17α-hydroxy-21-butyroxy-5-pregnene-3,20-dione 3-ethylene ketal, 1α,11α-epoxy - 16α-methyl-17α-hydroxy-21-octanoyloxy-5-pregnene-3,20-dione 3-ethylene ketal and the like.

EXAMPLE 10

*1α,11α-epoxy-17α,21-dihydroxy-5-pregnene-3,20-dione 3-ethylene ketal*

A solution was prepared containing 0.5 g. of 1α,11α-epoxy - 17α - hydroxy-21-acetoxy-5-pregnene-3,20-dione 3-ethylene ketal in methanol. This solution was purged with oxygen-free nitrogen for a period of 5 minutes and then a similarly oxygen purged solution of 0.250 g. of potassium bicarbonate dissolved in 1 ml. of methanol and 1 ml. of water was added. The mixture was maintained for 3 hours in a nitrogen atmosphere, then neutralized with hydrochloric acid, poured into 200 ml. of ice water and the thus-obtained mixture extracted with four 50 ml. portions of methylene chloride. The methylene chloride extracts were combined, washed several times with water, dried over anhydrous sodium sulfate and evaporated to give 1α,11α-epoxy-17α,21-dihydroxy-5-pregnene-3,20-dione 3-ethylene ketal, a light colored crystalline solid.

In the same manner, substituting as starting material 1α,11α - epoxy - 6-methyl-17-hydroxy-21-acetoxy-5-pregnene-3,20-dione 3-ethylene ketal, 1α,11α-epoxy-16α-methyl - 17α - hydroxy-21-acetoxy-5-pregnene-3,20-dione 3-ethylene ketal or 1α,11α-epoxy-16β-methyl-17α-hydroxy - 21 - acetoxy - 5-pregnene-3,20-dione-3-ethylene ketal, Example 10 is productive of 1α,11α-epoxy-6-methyl-17α,21-dihydroxy-5-pregnene-3,20-dione 3-ethylene ketal, 1α,11α - epoxy - 16α - methyl-17α,21-dihydroxy-5-pregnene-3,20-dione 3-ethylene ketal and 1α,11α-epoxy-16β-methyl-17α,21-dihydroxy-5-pregnene-3,20-dione 3-ethylene ketal, respectively.

Other 21-esters can likewise be hydrolyzed to the corresponding 21-free alcohols.

EXAMPLE 11

*1α,11α-epoxy-17α-hydroxy-21-acetoxy-5-pregnene-3,20-dione 3-ethylene ketal*

A solution of 100 mg. of 1α,11α-epoxy-17α,21-dihydroxy-5-pregnene-3,20-dione 3-ethylene ketal in 1 ml. of pyridine and 1 ml. of acetic anhydride was maintained at room temperature for 17 hours. Crushed ice in water was added and the product thus obtained was extracted with three 10 ml. portions of methylene chloride. The methylene chloride extracts were dried over anhydrous sodium sulfate, evaporated and the residue recrystallized from a mixture of ethyl acetate and hexanes to give 1α,11α - epoxy - 17α-hydroxy-21-acetoxy-5-pregnene-3,20-dione 3-ethylene ketal, identical to the same product prepared in Example 9, above.

In the same manner, substituting as starting material the other 21-hydroxy compounds prepared as listed in the second paragraph of Example 10, Example 11 is productive of 1α,11α - epoxy-6-methyl-17α-hydroxy-21-acetoxy-5-pregnene-3,20-dione 3-ethylene ketal, 1α,11α-epoxy - 16α - methyl-17α-hydroxy-21-acetoxy-5-pregnene-3,20-dione 3-ethylene ketal and 1α,11α-epoxy-16β-methyl-17α - hydroxy - 21-acetoxy-5-pregnene-3,20-dione 3-ethylene ketal, respectively.

Similarly, these 21-hydroxy starting materials can be converted, by esterification of the 21-hydroxy group, e.g., by reaction with the appropriate acid anhydride, acid chloride or bromide, ester by ester exchange, acid in the presence of an esterification catalyst, etc., to other corresponding 21-acylates, including those wherein the acyl group is the acyl radical of, for example, a lower aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic, 2,3-, 2,4-, 2,5-, 2,6- 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic acid, a dibasic acid (the ester of which can be converted, e.g., to a sodium salt), e.g., succinic acid.

EXAMPLE 12

*1α,11α-epoxy-17α-hydroxy-21-acetoxy-5-pregnene-3,20-dione*

A solution of 120 mg. of 1α,11α-epoxy-17α-hydroxy-21-acetoxy-5-pregnene-3,20-dione 3-ethylene ketal in about 20 ml. of acetone and 1.5 ml. of 1 N $H_2SO_4$ was gently boiled on the steam bath for 10 minutes. (The volume was reduced to about one-half.) The solution was cooled, diluted with 25 ml. of water, concentrated under reduced pressure till the acetone was removed, and cooled in an ice-bath. The resulting solid was filtered off to give 71 mg. of 1α,11α-epoxy-17α-hydroxy-21-acetoxy-5-pregnene-3,20-dione, M.P. 195–205°. The analytical sample, crystallized from acetone Skellysolve B, melted at 203–8°.

*Analysis.*—Calcd. for $C_{23}H_{30}O_6$: C, 68.67; H, 7.57. Found: C, 68.99; H, 7.30.

In the same manner, substituting as starting material

1α,11α-epoxy-6-methyl-17α-hydroxy-21-acetoxy-5-pregnene-3,20-dione 3-ethylene ketal,
1α,11α-epoxy-16α-methyl-17α-hydroxy-21-acetoxy-5-pregnene-3,20-dione 3-ethylene ketal,
1α,11α-epoxy-16β-methyl-17α-hydroxy-21-acetoxy-5-pregnene-3,20-dione 3-ethylene ketal or the corresponding 21-free hydroxy compounds prepared in Example 10, above, Example 12 is productive of the corresponding free 3-keto compound, 1α,11α-epoxy-6-methyl-17α-hydroxy-21-acetoxy-5-pregnene-3,20-dione,
1α,11α-epoxy-16α-methyl-17α,hydroxy-21-acetoxy-5-pregnene-3,20-dione,
1α,11α-epoxy-16β-methyl-17α-hydroxy-21-acetoxy-5-pregnene-3,20-dione,
1α,11α-epoxy-17α,21-dihydroxy-5-pregnene-3,20-dione,
1α,11α-epoxy-6-methyl-17α,21-dihydroxy-5-pregnene-3,20-dione,
1α,11α-epoxy-16α-methyl-17α,21-dihydroxy-5-pregnene-3,20-dione and
1α,11α-epoxy-16β-methyl-17α,21-dihydroxy-5-pregnene-3,20-dione.

In the same manner, the other 21-acylates prepared in Example 11 can likewise be converted to the corresponding free 3-keto compounds.

EXAMPLE 13

*1α,11α-epoxy-17:20,20:21-bismethylenedioxy-4-pregnen-3-one 3-ethylene ketal*

Substituting 17:30,20:21 - bismethylenedioxy-11β-hydroxy-4-pregnen-3-one 3-ethylene ketal as starting material in Example 7 is productive of 1α,11α-epoxy-17:20, 20:21-bismethylene-dioxy-4-pregnen - 3 - one 3 - ethylene ketal, a light colored crystalline solid.

In the same manner, 17:20,20:21-bismethylenedioxy-6-methyl-11β-hydroxy-4-pregnen-3-one 3 - ethylene ketal, 17:20,20:21-bismethylenedioxy-11β-hydroxy-16α-methyl-4-pregnen-3-one 3-ethylene ketal and
17:20,20:21-bismethylenedioxy-11β-hydroxy-16β-methyl-4-pregnen-3-one 3-ethylene ketal
are converted to 1α,11α-epoxy-6-methyl-17:20,20:21-bismethylenedioxy-4-pregnen-3-one 3-ethylene ketal, 1α,11α-epoxy-16α-methyl-17:20,20:21 - bismethylenedioxy-4-pregnen-3-one 3-ethylene ketal, and 1α,11α-epoxy-16β-methyl - 17:20,20:21 - bismethylenedioxy-4-pregnen-3-one 3-ethylene ketal, respectively.

EXAMPLE 14

*1α,11α-epoxy-17:20,20:21-bismethylenedioxy-5-pregnen-3-one*

Substituting 1α,11α-epoxy-17:20,20:21-bismethylenedioxy-5-pregnen-3-one 3-ethylene ketal as starting material in Example 12 is productive of 1α,11α-epoxy-17:20, 20:21-bismethylenedioxy-5-pregnen-3-one, a light colored crystalline solid.

In the same manner, substituting as starting material in Example 12, the other 6 and 16-substituted bismethylenedioxy compounds prepared and listed in the second paragraph of Example 13, is productive of the corresponding free 3 - keto-Δ⁵-compounds, 1α,11α - epoxy-6-methyl - 17:20,20:21-bismethylenedioxy-5-pregnen-3-one, 1α,11α-epoxy-16α-methyl-17:20,20:21 - bismethylenedioxy-5-pregnen-3-one and 1α,11α-epoxy-16β-methyl-17:20, 20:21-bismethylenedioxy-5-pregnen-3-one, respectively.

EXAMPLE 15

*11α,17α,21-trihydroxy-1,4-pregnadiene-3,20-dione 21-acetate*

A solution of 100 mg. of 1α,11α-epoxy-17α-hydroxy-21-acetoxy-5-pregnene-3,20-dione in absolute alcohol is prepared by warming. One hundred mg. of potassium acetate is added and the mixture is allowed to stir and reflux until the epoxide ring cleavage is complete. Water (about 50 ml.) is then added and the mixture is concentrated on the steam bath under reduced pressure to about 10 ml. or until crystallization starts. The mixture is then cooled and the solid isolated to give 11α,17α,21-trihydroxy-1,4-pregnadiene-3,20-dione 21-acetate, a light colored crystalline solid which can be further purified by recrystallization from a suitable solvent, e.g., acetone:hexanes.

In the same manner, substituting as starting material,

1α,11α-epoxy-6-methyl-17α-hydroxy-21-acetoxy-5-pregnen-3,20-dione,
1α,11α-epoxy-16α-methyl-17α-hydroxy-21-acetoxy-5-pregnen-3,20-dione,
1α,11α-epoxy-16β-methyl-17α-hydroxy-21-acetoxy-5-pregnen-3,20-dione,
1α,11α-epoxy-17α,21-dihpdroxy-5-pregnen-3,20-dione,
1α,11α-epoxy-6-methyl-17α,21-dihydroxy-5-pregnene-3,20-dione,
1α,11α-epoxy-16α-methyl-17α,21-dihydroxy-5-pregnene-3,20-dione,
1α,11α-epoxy-16β-methyl-17α,21-dihydroxy-5-pregnene-3,20-dione or other 21-acylates of these compounds, Example 15 is productive of 6α-methyl-11α,17α,21-trihydroxy-1,4-pregnadiene-3,20-dione 21-acetate,
16α-methyl-11α,17α,21-trihydroxy-1,4-pregnadiene-3,20-dione 21-acetate,
16β-methyl-11α,17α,21-trihydroxy-1,4-pregnadiene-3,20-dione 21-acetate,
11α,17α,21-trihydroxy-1,4-pregnadiene-3,20-dione,
6α-methyl-11α,17α,21-trihydroxy-1,4-pregnadiene-3,20-dione,
16α-methyl-11α,17α,21-trihydroxy-1,4-pregnadiene-3,20-dione,
16β,methyl-11α,17α,21-trihydroxy-1,4-pregnadiene-3,20-dione or other 21-acylates thereof, respectively.

EXAMPLE 16

*11α-hydroxy-17:20,20:21-bismethylenedioxy 1,4-pregnadien-3-one*

A solution of 100 mg. of 1α,11α-epoxy-17:20,20:21-bismethylenedioxy 5-pregnene-3-one in absolute alcohol is prepared by warming. One hundred mg. of potassium acetate is added and the mixture is allowed to stir and reflux until the epoxide ring cleavage is complete. Water (about 50 ml.) is then added and the mixture is concentrated on the steam bath under reduced pressure to about 10 ml. or until crystallization starts. The mixture is then cooled and the solid is isolated to give 11α-hydroxy-17:20, 20:21 - bismethylenedioxy-1,4-pregnadien-3-one, a light colored crystalline solid which can be further purified by recrystallization from a suitable solvent, e.g., acetone-hexanes.

In the same manner, substituting as starting material,

1α,11α-epoxy-6-methyl-17:20,20:21-bismethylenedioxy-5-pregnen-3-one,
1α,11α-epoxy-16α-methyl-17:20,20:21-bismethylenedioxy-5-pregnen-3-one or
1α,11α-epoxy-16β-methyl-17:20,20:21-bismethylenedioxy-5-pregnen-3-one, is productive of 6-methyl-11α-hydroxy-17:20,20:21-bismethylenedioxy-1,4-pregnadien-3-one,
11α-hydroxy-16α-methyl-17:20,20:21-bismethylenedioxy-1,4-pregnadien-3-one and
11α - hydroxy-16β-methyl-17:20,20:21 - bismethylenedioxy-1,4-pregnadien-3-one, respectively.

EXAMPLE 17

*1α,11α-epoxypregnenolone acetate*

To a hot solution of 0.75 g. of 11α-hydroxypregnenolone 3-acetate in 300 ml. of purified cyclohexane was added 4 g. of ether washed lead tetraacetate. The mixture was allowed to stir and reflux for about 4 hours and was then cooled and filtered through diatomaceous earth (Celite). The filtrate was washed with 5% potassium iodide solution, 5% sodium thiosulfate solution, and water was dried over anhydrous sodium sulfate. Chromatography of the solution over 100 g. of Florisil resulted in the product fraction being eluted with 7.5% acetone in Skellysolve B. Recrystallization of this material from acetone 240 mg. of 1α,11α-epoxypregnenolone acetate, M.P. 150–157°. An analytical sample melted at 152–157°; [α]$_D$ —20° (CHCl$_3$).

*Analysis.*—Calcd. for $C_{23}H_{32}O_4$: C,74.16; H, 8.66. Found: C, 73.55; H, 8.62.

In the same manner, substituting as starting material, 11α-hydroxy-16α-methylpregnenolone 3-acetate or 11α-hydroxy-6-methylpregnenolone-3-acetate, Example 17 is productive of 1α,11α - epoxy-16α-methylpregnenolone acetate and 1α,11α-epoxy-6-methylpregnenolone acetate, respectively.

EXAMPLE 18

*1α,11α-epoxypregnenolone acetate*

Treatment of 0.96 g. of 11β-hydroxypregnenolone 3-acetate with 7 g. of lead tetraacetate for 15 hours as given above for the 11α-hydroxy epimer, gave 113 mg. of 1α,11α-epoxy pregnenolone acetate, M.P. 142–155°. The analytical sample melted at 149–155°; [α]$_D$ —17° (CHCl$_3$).

*Analysis.*—Calcd. for $C_{23}H_{32}O_4$: C, 74.16; H, 8.66. Found: C, 74.36; H, 9.06.

There was no depression in melting point when the two epoxides from Examples 16 and 17 were mixed and the infrared curves of the two were identical.

In the same manner, substituting as starting material, 11β-hydroxy-16α-methylpregnenolone acetate, or 11β-hydroxy-6-methylpregnenolone 3-acetate, Example 18 is productive of 1α,11α-epoxy-16α-methylpregnenolone acetate and 1α,11α-epoxy-6-methylpregnenolone acetate, respectively.

EXAMPLE 19

*1α,11α-epoxypregnenolone*

100 mg. of 1α,11α-epoxypregnenolone acetate, 1.0 ml. of 1 N sodium hydroxide solution and 10 ml. of methanol was refluxed for about 15 minutes under nitrogen, then neutralized with hydrochloric acid, poured into 50 ml. of ice water and the thus-obtained mixture extracted with three 10 ml. portions of methylene chloride. The extracts were combined, washed with water, dried over sodium sulfate and evaporated to give 1α,11α-epoxypregnenolone, a light colored crystalline solid.

In the same manner, substituting 1α,11α-epoxy-16α-methylpregnenolone acetate or 1α,11α-epoxy-6-methylpregnenolone acetate as the starting material, Example 19 is productive of 1α,11α-epoxy-16α-methylpregnenolone and α,11α-epoxy-6-methylpregnenolone, respectively.

EXAMPLE 20

*1α,11α-epoxypregnenolone acetate*

A solution of 100 mg. of 1α,11α-epoxypregnenolone in 1 ml. of pyridine and 1 ml. of acetic anhydride was maintained at room temperature for about 17 hours. Crushed ice and water was added and the 1α,11α-epoxypregnenolone acetate thus obtained was extracted with three 10 ml. portions of methylene chloride. The methylene chloride extracts were dried over anhydrous sodium sulfate, evaporated and the residue recrystallized from a mixture of ethyl acetate and hexanes to give 1α-11α-epoxypregnenolone acetate, identical to the same product obtained in Example 17.

In the same manner, substituting 1α,11α-epoxy-16α-methylpregnenolone or 1α,11α-epoxy-6-methylpregnenolone as starting material, Example 20 is productive of 1α,11α-epoxy-16α-methylpregnenolone acetate and 1α,11α-epoxy-6-methylpregnenolone acetate, respectively.

Similarly, 1α,11α-epoxypregnenolone, 1α,11α-epoxy-16α-methylpregnenolone and 1α,11α-epoxy-6-methylpregnenolone are converted, by esterification of the 3-hydroxy group, e.g., by reaction with the appropriate acid anhydride, acid chloride or bromide, ester by ester exchange, acid in the presence of an esterification catalyst, to other 1α,11α-epoxypregnenolone acylates, 1α,11α-epoxy-16α-methylpregnenolone acylates and 1α,11α-epoxy-6-methylpregnenolone acylates, including those wherein the acyl group is the acyl radical of, for example, the acids listed in Example 11.

The lead tetraacetate used in the above examples was triturated 4 times with anhydrous ether before using to remove acetic acid which is present in the material as purchased.

I claim:

1. A compound selected from the formulae:

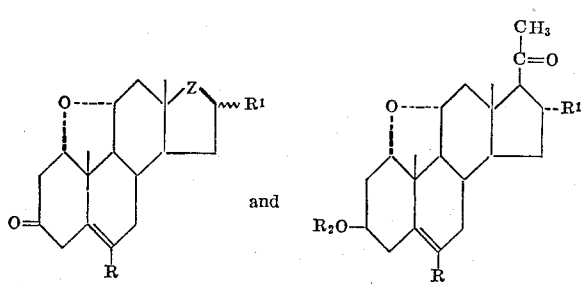

wherein R and R¹ are selected from the group consisting of hydrogen and methyl and in which when R is methyl R¹ is hydrogen, R₂ is selected from the group consisting of hydrogen and the acyl radical of a hydrocarbon carboxylic acid containing from 1 to 12 carbon atoms, inclusive, and Z is selected from the group consisting of:

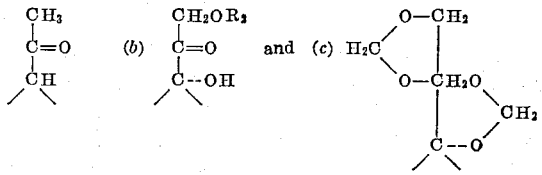

in which R² is defined as above.

2. 1α,11α-epoxy-17α,21-dihydroxy-5-pregnene-3,20-dione.
3. 1α,11α-epoxy-17α-hydroxy-21-acetoxy-5-pregnene-3,20-dione.
4. 1α,11α-epoxy-3β-hydroxy-5-pregnen-20-one.
5. 1α,11α-epoxy-3β-acetoxy-5-pregnen-20-one.
6. 1α,11α-epoxy-5-androstene-3,17-dione.
7. A compound of the formula:

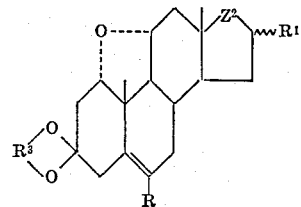

wherein R and R¹ are selected from the group consisting of hydrogen and methyl in which when R is methyl R¹ is hydrogen, R₃ is an alkylene radical containing from 2 to 8 carbon atoms, inclusive, and the attaching oxygen to carbon bonds are separated by a chain of at least 2 but not more than 3 carbon atoms, and Z³ is selected from the group consisting of:

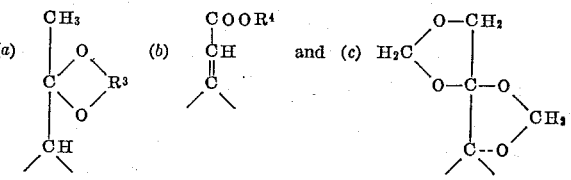

in which R³ is defined as above and R⁴ is lower-alkyl radical, containing from one to 8 carbon atoms, inclusive.

8. Methyl - 1α,-11α-epoxy-5,17(20)[cis]-pregnadien-3-one-21-oate-3-ethylene ketal.

9. A process for the production of 1α,11α-epoxy steroids of the androstane and pregnane series which comprises oxidizing an 11-hydroxy steroid selected from the group consisting of the androstane and pregnane series, containing no other free hydroxyl group with lead tetraacetate to produce the corresponding 1α,11α-epoxy steroid.

10. A process for producing Δ¹,⁴-11α-hydroxy steroids of the androstane and pregnane series which comprises treating a Δ⁵-1α,11α-epoxy-3-keto compound selected from the group consisting of the androstane and pregnane series with a member of the group consisting of an acid and a base to produce the corresponding Δ¹,⁴-11α-hydroxy steroid.

11. A process for the production of a compound of the formula:

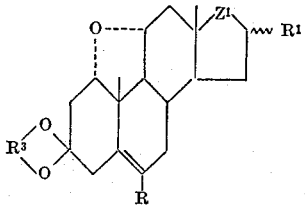

wherein R and R¹ are selected from the group consisting of hydrogen and methyl in which when R is methyl R¹ is hydrogen, R³ is an alkylene radical containing from 2 to 8 carbon atoms, inclusive, and the attaching oxygen to carbon bonds are separated by a chain of at least 2 but not more than 3 carbon atoms, and Z¹ is selected from the group consisting of:

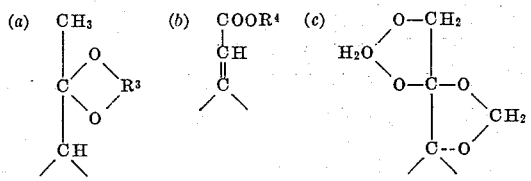

in which R³ is defined as above and R⁴ is a lower-alkyl radical containing from 1 to 8 carbon atoms, inclusive which comprises: oxidizing a compound of the formula:

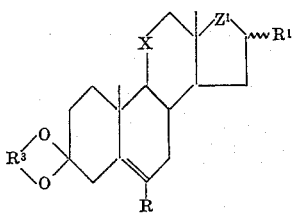

wherein R, R¹, R³ and Z¹ are defined as above and X is selected from the group consisting of the α-hydroxymethylene radical and the β-hydroxymethylene radical, with lead tetraacylate to produce the corresponding 1α,11α-epoxide.

12. A process for the production of 1α,11α-epoxyprogesterone bis ethylene ketal which comprises: oxidizing 11α-hydroxyprogesterone bis ethylene ketal with lead tetraacetate to produce 1α,11α-epoxyprogesterone bis ethylene ketal.

13. A process for the production of 1α,11α-epoxy-4-androstene-3,17-dione bis alkylene ketal which comprises: oxidizing a compound selected from the group consisting of 11β-hydroxy-4-androstene-3,17-dione bis alkylene ketal and 11α-hydroxy-4-androstene-3,17-dione bis alkylene ketal with lead tetraacylate to produce 1α,11α-epoxy-4-androstene-3,17-dione bis alkylene ketal.

14. A process for the production of methyl-1α,11α-epoxy - 5,17(20)[cis]-pregnadiene-3-one-21-oate 3-ethylene ketal which comprises: oxidizing methyl 11α-hydroxy-5,17(20)-[cis]-pregnadien-3-one-21-oate 3-ethylene ketal with lead tetraacetate to produce the corresponding 1α,11α-epoxy compound.

15. A process for the production of a compound of the formula:

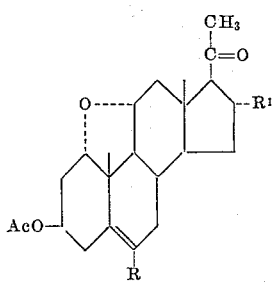

wherein Ac is the acyl radical of an organic carboxylic acid, R and R¹ are selected from the group consisting of hydrogen and methyl, in which when R is methyl R¹ is hydrogen, which comprises: oxidizing a compound of the formula:

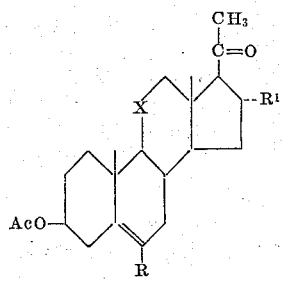

wherein Ac and R and R¹ are defined as above and X is selected from the group consisting of the α-hydroxymethylene radical and the β-hydroxymethylene radical, with lead tetraacylate to produce the corresponding 1α,11α-epoxy compound.

16. A process for the production of a compound of the formula:

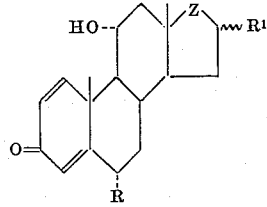

wherein R and R¹ are selected from the group consisting of hydrogen and methyl in which when R is methyl R¹ is hydrogen and Z is selected from the group consisting of

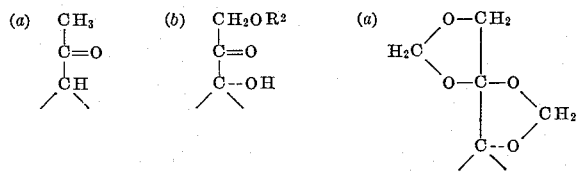

in which R² is selected from the group consisting of hydrogen and the acyl radical of an organic carboxylic acid, which comprises treating a compound of the formula:

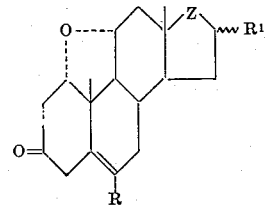

wherein R, R¹ and Z are defined as above, with an acid or a base to produce the corresponding Δ¹,⁴-11α-hydroxy compound.

17. A process for the production of 1-dehydro-11α-hydroxy-progesterone which comprises treating 1α,11α-epoxy-5-pregnene-3,20-dione with potassium acetate to produce the corresponding Δ¹,⁴-11α-hydroxy compound.

18. A process for the production of 11α,17α,21-trihydroxy-1,4-pregnadiene-3,20-dione 21-acetate which comprises: treating 1α,11α - epoxy-21-hydroxy-5-pregnene-3,20-dione 21-acetate with potassium acetate to produce the corresponding Δ¹,⁴-11α-hydroxy compound.

19. A compound selected from the group consisting of 6β,11α - dihydroxy - 6α-methyl-3,5-cyclopregnane-20-one and 6β,11β - dihydroxy-6α-methyl-3,5-cyclopregnane-20-one.

20. A compound selected from the group consisting of a compound of the formula

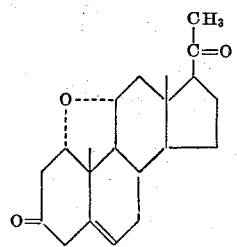

and the corresponding 3,20-bisethylene ketal thereof.

References Cited by the Examiner

UNITED STATES PATENTS

| | | | |
|---|---|---|---|
| 2,602,769 | 7/1952 | Murray et al. | 195—51 |
| 2,838,501 | 6/1958 | Campbell et al. | 260—239.55 |

OTHER REFERENCES

Kalvoda et al.: Helv. Chim. Acta, vol. 44, pages 186–198, Feb. 1, 1961.

LEWIS GOTTS, *Primary Examiner.*

MORRIS LIEBMAN, IRVING MARCUS, *Examiners.*

H. A. FRENCH, *Assistant Examiner.*